(No Model.)
T. L. MARVEL.
ENDLESS BUCKET CONVEYER.
No. 567,683. Patented Sept. 15, 1896.
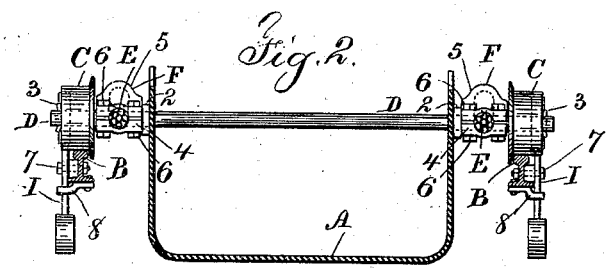
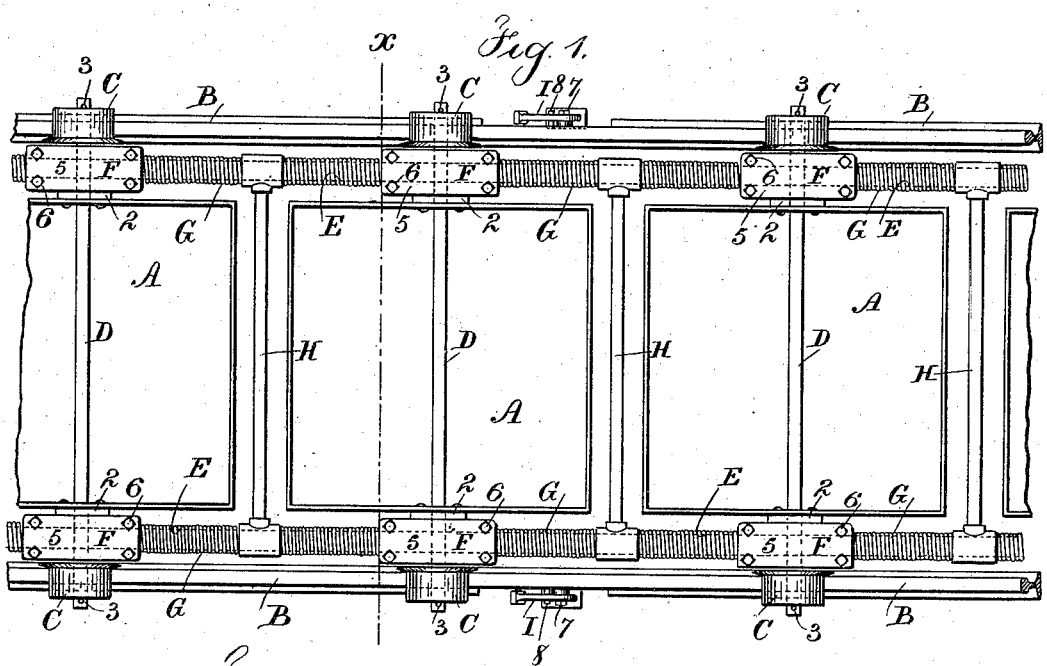
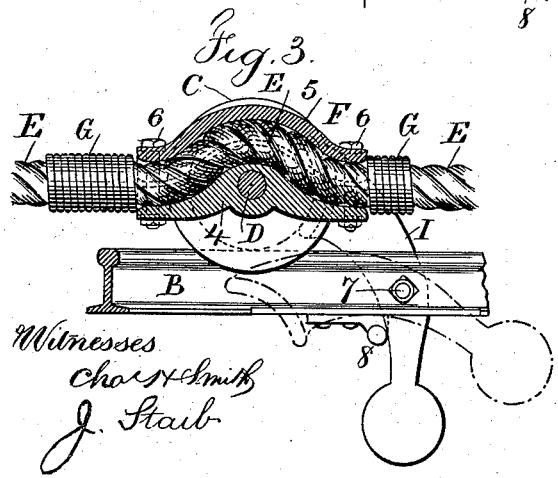
Witnesses
Chas. H. Smith
J. Staib
Inventor
Theodore L. Marvel
per
Lemuel W. Serrell
Atty.
THE NORRIS PETERS CO., PHOTO-LITHO., WASHINGTON, D. C.

UNITED STATES PATENT OFFICE.

THEODORE L. MARVEL, OF TAUNTON, MASSACHUSETTS.

ENDLESS BUCKET CONVEYER.

SPECIFICATION forming part of Letters Patent No. 567,683, dated September 15, 1896.

Application filed December 10, 1894. Serial No. 531,324. (No model.)

*To all whom it may concern:*

Be it known that I, THEODORE L. MARVEL, a citizen of the United States, residing at Taunton, in the county of Bristol and State of Massachusetts, have invented an Improvement in Endless Bucket Conveyers, of which the following is a specification.

Pivoted buckets have been used in an endless series connected together by links forming chains one at each side of the range of buckets, and these links have also been provided with cross-bars connecting the one chain with the other and either intervening between one bucket and the next or crossing over and forming the pivot upon which each bucket is suspended. In conveyers of this character difficulty has been experienced in avoiding wear upon the pivots of the chainlinks and in preventing the noise incident to the movement of such loose links, and in addition to this where the endless series of buckets is passed from one level to another there is a large amount of weight upon the chains, and the links are liable to injury, and the wear upon the links tends to lengthen the chains and prevent the links properly engaging the sprocket-wheels around which such chains pass.

The object of the present invention is to provide for the connection in endless series of pivoted buckets by means of wire ropes in place of chain-links, the connections of the buckets to the wire ropes being made by peculiar clamps that act to give a bend to the rope and prevent slipping and at the same time allow for adjustment from time to time to cause the endless conveyer to correspond to the sprocket-wheel and compensate wear or elongation of the wire ropes, and the buckets are pivoted to the clamping devices so that they can hang by gravity in passing from one position to another, and the wire ropes are bent but little in passing around the circular portions of the wheels where the endless conveyer receives a change of direction.

To protect the wire ropes from wear, and also for aiding in retaining lubricating material, a helix is applied around such rope between one pivotal clamp and the next.

In endless-chain conveyers it sometimes happens that the power by which the conveyer is propelled is stopped at a time when full buckets are being drawn up from one level to another, and the weight of these buckets causes the endless conveyer to run backwardly, at the risk of injury to attendants or to the mechanism. To prevent this difficulty, I provide holding-dogs at proper places and peculiarly constructed with reference to engaging the pivotal portions of the endless conveyer, thereby holding the same from any reverse or backward motion.

In the drawings, Figure 1 is a general plan view illustrating the present improvement. Fig. 2 is a cross-section of the track and conveyer at the line $xx$ of Fig. 1, and Fig. 3 is a section in larger size of one of the conveyerclamps and an elevation of the holding device for preventing the conveyer running backwardly.

The buckets A, tracks B, and wheels C are of any desired character, the buckets being adapted to receive any material to be conveyed from one place to another, such as coal, ore, ashes or mineral substances, or grain, and the tracks B are to lead in any desired direction and they are suitably supported and adapted to the wheels C which run upon such tracks.
The pivots D of the buckets may be in the form of a bar extending across the bucket, or such pivots may project from plates 2 fastened to such buckets, both these modes of construction being well known, and it is generally advantageous to have the pivots D sufficiently long to form axles for the wheels, and such wheels may be secured to the axles by cross-pins 3, nuts, or any other suitable device, and it is usually advantageous for the wheels to revolve upon the pivots or axles, but the wheels may be fastened to the pivots or axles and revolve with them in bearings or journals upon the buckets and connectingclamps.
The wire ropes E are provided one at each side of the endless series of buckets, and the clamps F serve to connect the pivots of the buckets with the wire ropes. These clamps are advantageously formed of two pieces 4 and 5, the parts 4 having holes through them for the passage of the pivots or axles D, and the parts 5 serving to clamp the ropes E to the parts 4, and the adjacent surfaces of these pieces 4 and 5 are grooved to correspond to the size of the wire ropes, and it is advantageous to curve the adjacent surfaces of these pieces 4 and 5 so that the centers of the wire ropes are in line with the centers of the pivots, and the curvature of the surfaces of the clamps causes the wire ropes to pass either above or below the pivots, and the parts 4 and 5 being bolted together by bolts or screws 6 the wire ropes are caused to assume a compound curved form at each of the clamps, and this lessens the risk of the clamps slipping upon the rope and at the same time causes the strain or tension upon the ropes to be in line with the pivots of the buckets.

In order to protect the wire ropes from wear and to aid in retaining tallow and other lubricating material, closely-wound helices G of wire are applied around the wire ropes between one clamp and the xext. These helices do not interfere with the bending of the ropes as they pass around the sprocket-wheels of the conveyer and they aid in protecting the ropes from injury; and I remark that it is advantageous to employ white lead or similar material around the ropes and within the clamps F to lessen the risk of water acting to rust the wire ropes.

If desired, cross-bars H may be applied between one wire rope and the next and between one bucket and the next to hold the wire ropes at the proper distances apart, and upon the ends of these cross-bars clamps or sleeves are applied, of any desired character, to grasp the wire ropes and hold the cross-bars in their proper relative positions to the ropes and buckets.

To prevent the endless series of buckets moving backwardly in this conveyer when the propelling power may be stopped, I apply pawls or dogs I at suitable places pivoted at 7, preferably upon the track, and each having a weighted end and stop 8 to limit the movement of the end of the pawl, and the pawl is depressed, as shown by dotted lines, Fig. 3, by a wheel, clamp, pivot, or cross-bar as the endless conveyer is moved along, and such pawl swings up between the passage of one of the devices and the next so as to be in a position to hold the endless conveyer and prevent a backward movement when the propelling power is stopped. Usually each pawl is curved at the end, as shown, to fit against the edge of either of the wheels.

It will be apparent that in consequence of the wire ropes or cables being flexible in any direction the conveyer can be led to any desired place either horizontally or vertically, whereas in conveyers in which the buckets are connected by rigid links the flexibility is only in one direction and the conveyers cannot be easily diverted from one vertical plane in which they are fitted to move.

I claim as my invention—

1. The combination in an endless conveyer having a series of gravity-buckets and cross-shafts forming pivots for the buckets, and tracks and wheels for supporting such conveyers, of endless wire ropes one at each side, and two-part clamps having curved openings through between them for the ropes, one part of each clamp having an opening at right angles to the rope and receiving through it the cross-shaft, and bolts at opposite sides of the shaft for connecting the two-part clamps together.

2. The combination with the buckets, tracks and wheels in an endless conveyer, of cross-bars forming pivots for the buckets and axles for the wheels, endless ropes and clamps for grasping the ropes and for receiving through them the cross-bars, and wire helices around the ropes and between the respective clamps, substantially as specified.

3. The combination with the gravity-buckets, tracks and wheels in an endless conveyer, of cross-bars forming pivots for the buckets and axles for the wheels, endless ropes and clamps for grasping the ropes and for receiving through them the cross-bars, cross-bars between the buckets and sleeves or clamps at their ends through which the ropes pass, and wire helices around the wire ropes and between the respective sleeves or clamps, substantially as set forth.

Signed by me this 10th day of November, 1894.

THEO. L. MARVEL.

Witnesses:
GEO. T. PINCKNEY,
S. T. HAVILAND.